H. GLOSSER.
Stereoscope Case.
No. 24,115.
Patented May 24, 1859.
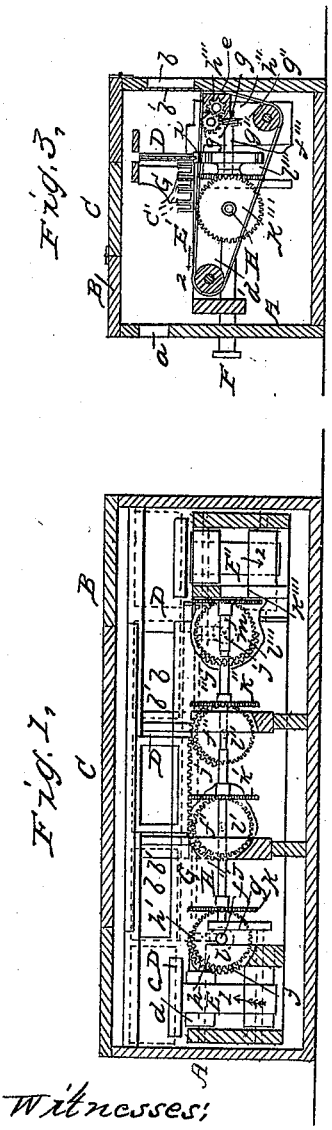
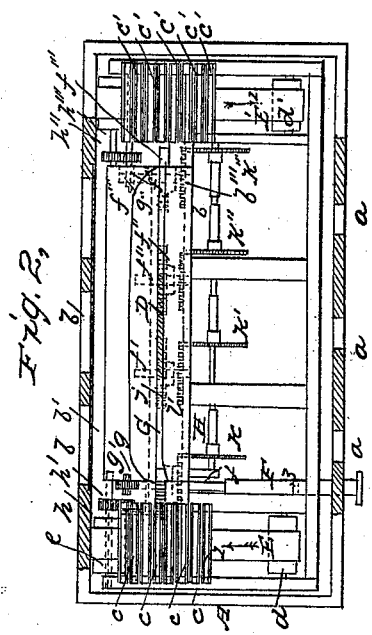
Witnesses:
James H. Hopkins
Wm Tusch
Inventor:
Henry Glosser

UNITED STATES PATENT OFFICE.

HENRY GLOSSER, OF NEW YORK, N. Y.

CASE FOR STEREOSCOPIC PICTURES.

Specification of Letters Patent No. 24,115, dated May 24, 1859.

*To all whom it may concern:*

Be it known that I, HENRY GLOSSER, of the city, county, and State of New York, have invented certain new and useful Improvements in Stereoscopic Cases; and I do hereby declare that the following is a full, clear, and exact description of the same, reference being had to the accompanying drawings, forming a part of this specification, in which—

Figure 1 represents a vertical longitudinal section of a stereoscopic base constructed according to my invention. Fig. 2 is a plan or top view of the same with the top removed. Fig. 3 is a transverse vertical section of the same.

Similar letters of reference in the three figures indicate corresponding parts.

This invention consists in arranging the case with a series of eye glasses on the same side, and with one common reflector for all of them, so that a number of persons can have a look at the contents of the case at one and the same time, and the picture frames are so arranged that they are brought before the different eye glasses by the action of one and the same key or handle, a double motion being given to the same, one in the direction transversely through the case, and one in a longitudinal direction, the motion in both directions being intermittent, so that sufficient time is allowed to the spectators to look at each picture before it is replaced by another one.

To enable those skilled in the art to fully understand make and use my invention I will proceed to describe its construction and operation.

A represents a case constructed of wood or any other suitable material, and in the usual form given to stereoscopic cases, with the only exception that the same is made considerably longer so as to give room to several pairs of eye glasses, $a$, which are at such distances one from the other that several persons can conveniently look into the same without disturbing one another, and it must be remarked that the openings, $a$, in Figs. 2 and 3, are to represent the double eye glasses each, such as are usually attached to stereoscopic cases.

Inserted into the side of the case opposite to the eye glasses are the apertures, $b$, covered with a glass plate, $b'$, which may be divided into several panes to correspond to the number of eye glasses, or which may be made out of one continuous plate placed over the several apertures, $b$; and hinged to the top or lid, B, of the case is the reflector, C, which is long enough so that it serves as a common reflector for the several eye glasses.

The picture frames, D, are arranged in sockets, $c$, which are attached to an endless belt, E, placed over rollers, $d$ and $e$, on one side of the case, and a similar belt, E', with a corresponding number of sockets, $c'$, is arranged on rollers, $d'$ and $e'$, on the other side of the case for the purpose of taking off the picture frames after they have passed before the whole series of eye glasses. The belt, E, receives its motion by means of a handle or key, F, attached to an arbor, $f$, to the end of which a cam, $g$, is attached which gears into a worm-wheel, $g'$, the motion of which is conveyed to a pinion, $h$, which is attached to the arbor, $h'$, of the roller, $e$, and the shape of the cam, $g$, which resembles a worm-screw with a left handed thread, is such that the belt, F, is moved on at certain intervals over a space equal to the distance from one of the sockets, $c$, to the next adjoining one.

Arranged in a longitudinal direction through the entire length of the case, and extending from the belt, E, to the belt, E', is the channel, G, in which the picture frames slide along from one pair of eye glasses to the other; and the picture frames are arranged with rack teeth, $i$, at the lower edge, and a cam, $j$, which is attached to the arbor, $f$, and which is provided with a series of cogs running partly around its circumference, serves to draw the picture frames from the sockets, $c$, into the channel, G, and before the first pair of eye glasses. Another cam, $j'$, similar to the cam, $j$, is arranged on an arbor, $f'$, in such relation to the channel, G, that the cogs, which extend partly around its circumference in the same manner as the cogs on the cam, $j$, reach through a slot in the bottom of the channel. This cam serves to draw the picture frames along in the channel, G, before the second pair of eye glasses; and a similar cam, $j''$, arranged in the same relation to the channel, G, on an arbor $f''$, brings the picture frames before the third pair of eye glasses and so on until the last cam, $j'''$, which is attached to the arbor, $f'''$, pushes the picture frames out of the channel, G, into one of the sockets, $c'$, on the belt, E'. The distance of these cams must be in accordance with the length of the picture frames, so that the latter pass from one cam to the other.

Motion is conveyed to the several cams, $j'$ $j''$ $j'''$, by means of a line shaft, H, which extends from one end of the case to the other one and parallel to the channel, G, and to which the gear wheels, $k$ $k'$ $k''$ and $k'''$, are fastened which mesh into similar wheels, $l$ $l'$ $l''$ $l'''$, which are secured to the arbors, $f$ $f'$ $f''$ and $f'''$, as clearly represented in Figs. 1 and 2. The arbor, $f'''$, extends through, under the channel, G, to the back part of the case, as clearly shown in Figs. 2 and 3; and a cam, $g'''$, is secured on its inner end, similar, in every respect, to the cam, $g$, on the arbor, $f$, with the only exception that the thread which forms this cam is a right handed screw-thread, and this cam gears into a worm-wheel, $g''$, from which motion is conveyed to the roller, $e'$, by means of a pinion, $h''$, which is secured to the arbor, of the roller, $e'$. And as the screw thread which constitutes the cam, $g$, is left handed, and that one constituting the cam, $g'''$, right handed, both moving in the same direction, the motion conveyed to the belt, E, is in the direction of arrow 1, and the motion of the belt, E', in the direction of arrow 2, and the picture frames, fed into the channel, G, from the sockets, $c$, of the belt, E, are brought out to the front of the case by the action of the belt, E'.

The operation is as follows:—The picture frames filled with the desired pictures are arranged in the sockets, $c$, on the upper side of the belt, E, and the machinery is set in motion by turning the key or handle, F, in the direction from right to left, as indicated by arrow 3 in Fig. 2. By the action of the cam, $g$, on the roller, $e$, the sockets, $c$, are drawn along in the direction of arrow 1; and, whenever one of the sockets, $c$, comes in line with the channel, G, the teeth of the cam, $j$, by gearing into the cogs, $i$, at the lower end of the picture frame carry the same into the channel, G, leaving them in proper position for the first pair of eye glasses, and the teeth of the cam, $j$, are in such relation to the cam, $g$, that the latter acts on the belt, E, while the cam, $j$, is out of gear with the picture frame, and that the belt, E, remains stationary during that space of time, in which the cogs of the cam, $j$, act on the picture frames. Each picture frame is left stationary before the first pair of eye glasses until by the continued motion of the key, F, the teeth of the second cam, $j'$, come to gear into the cogs, $i$, at the lower edge of the picture frames whereby they are brought before the second pair of eye glasses and at the same time a second frame is drawn into the channel, G, from the belt, E, by the action of the first cam, $i$, and in this manner the picture frames are drawn into the channel and moved from one pair of eye glasses to the other by the successive action of the cams, $j$ $j'$ $j''$, until the last cam, $j'''$, carries the same out into one of the sockets, $c'$, which are brought to correspond with the channel G, one after the other by the action of the cam, $g'''$, on the roller, $e'$. And as these sockets move in the direction of arrow 2 the several picture frames are collected in the front part of one end of the case in the same order in which they have been fed into the sockets, $c$, on the other end.

What I claim as new and desire to secure by Letters Patent is:—

1. The arrangement of two or more pairs of eye glasses on the same side of a stereoscopic case so that several persons can look at the pictures at one and the same time, substantially in the manner herein specified.

2. The picture frames, D, arranged with cogs, $i$, or their equivalent, at their lower edges in combination with the cams, $j$ $j'$ $j''$ and $j'''$, or their equivalents, whereby the same are made to travel from one pair of eye glasses to the other, substantially as herein described.

3. Giving a double motion to the picture frames, first in a direction transversely through the case by the action of the cam, $g$, or its equivalent on the endless belt, E, and second, in a longitudinal direction by the action of the cams, $j$, substantially as and for the purpose set forth.

4. The arrangement and combination of the endless belts E and E', to operate in relation to the channel, G, substantially as and for the purpose described.

5. The cams, $g$ and $g'''$, arranged in combination with the cams, $j$ $j'$ etc., or their equivalents in such a manner that they produce the within described motion of the picture frames at alternate intervals, substantially as and for the purpose specified.

HENRY GLOSSER.

Witnesses:
JAMES H. HOPKINS,
WM. TUSCH.